United States Patent
Anzini

[11] 3,927,441
[45] Dec. 23, 1975

[54] ROPE STRETCHER PROVIDED WITH IMPROVED UNCLAMPING DEVICE

[75] Inventor: Renato Anzini, Minusio, Switzerland

[73] Assignee: Ampaglas S.p.A., Italy

[22] Filed: Feb. 26, 1974

[21] Appl. No.: 445,979

[30] Foreign Application Priority Data
Feb. 26, 1973 Italy .................................. 20832/73

[52] U.S. Cl. ................................................. 24/136
[51] Int. Cl.² .......................................... F16G 11/00
[58] Field of Search ............................. 24/136, 236

[56] References Cited
UNITED STATES PATENTS
2,200,895    5/1940   Rio .................................... 24/136 R
3,628,221   12/1971   Dasbrig ........................... 24/136 B
3,779,347   12/1973   Chevalier ........................ 24/136 R Primary Examiner—Paul R. Gilliam
Assistant Examiner—Doris L. Troutman
Attorney, Agent, or Firm—Rose & Edell

[57] ABSTRACT

A rope stretcher comprises a hollow casing with a cylindrical bore containing therein a plunger biased by first and second coaxial springs against the cable to be clamped, which cable is first introduced into the outer end of said bore and finally through a lateral sloped passage. By releasing the previously compressed first and second springs, the outer end of said plunger, bearing a grip roller, fastens the cable against the inner wall of the hollow casing and this fastening is then strengthened by the tensioning force.

4 Claims, 3 Drawing Figures

ROPE STRETCHER PROVIDED WITH IMPROVED UNCLAMPING DEVICE

BACKGROUND OF THE INVENTION

This invention relates to a rope stretcher provided with an improved unclamping device, suitable for use in any field where it is necessary to clamp tensioned cables.

Several devices of the prior art are fitted for fastening and joining cables, without knotting or lacing them, thus avoiding the disadvantages and the low reliability which rise from those operations, and thus allowing faster and easier operations as a whole.

However said devices are not free from drawbacks, even remarkable, which limit to a great extent the application thereof.

A very important problem, not yet solved in the art, relates to the difficulty arising from the unclamping of a very strongly tensioned cable. In fact, since the devices known in the art fasten and clamp a cable by gripping it between the inner wall of a bore provided in a cylindrical casing and a small retractable inner plunger coaxial thereto, it is evident that the unclamping operation, which requires withdrawing of said plunger, can be very strongly hindered by the transmission of the tensioning force opposite the direction of the unclamping stroke, controlled by the actuation of an outer knob on the cylindrical casing.

A further disadvantage of the tensioning devices already known in the art, relates to the fairly high difficulty arising from the clamping operation, when it is necessary to use a hand to keep said clamping plunger withdrawn, while inserting the cable into the cylindrical casing.

SUMMARY OF THE INVENTION

Therefore it is an object of this invention to provide a rope stretcher with an improved unclamping device, so that a clamped cable can be released independently from the tension thereof by transmitting a disengaging force whose corresponding work is constant and substantially negligible.

The rope stretcher of this invention comprises a casing provided with a bore, which houses a plunger having at the one end a member rotatably mounted and biased by a spring towards the clamping opening for the cable to be secured, and it is characterized in that the rod of said plunger is encircled by an auxialiary spring and by a small cylinder provided with a through-hole, for connecting it to a knob, to be actuated from the outside, for said plunger. The ends of said auxiliary spring abut respectively on a shoulder at the rear end of said plunger rod, and on a side inner shoulder of said cylinder.

BRIEF DESCRIPTION OF THE DRAWINGS

This invention will be hereunder described in detail, only by way of a non-limiting example, with reference to a preferred embodiment thereof, illustrated in the annexed drawings, wherein.

DESCRIPTION OF THE PREFERRED EMBODIMENT

Figure 1:
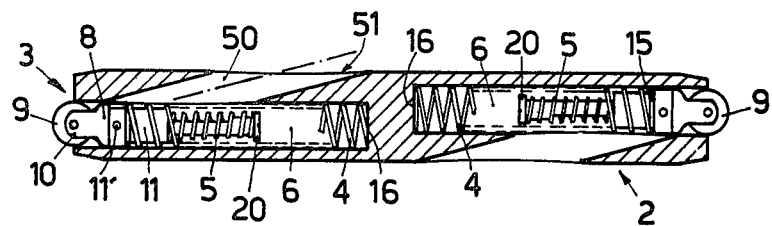
FIG. 1 shows a longitudinal partial section of a rope stretcher according to a preferred embodiment of this invention, in which two clamping and unclamping units are assembled.

Referring to FIG. 1 the rope stretcher casing is identified in general with numeral reference 2, and there are shown a plunger 3, a small cylinder 11 and two coaxial springs 4 and 5.

Figure 2:
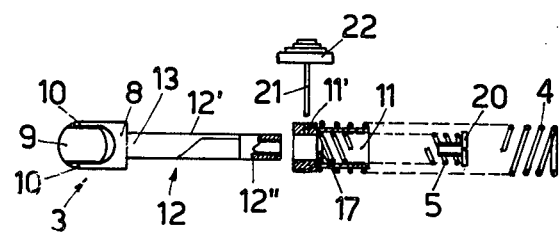
FIG. 2 is an exploded view of the elements assembled in FIG. 1, composing a clamping and unclamping unit.

As pointed out in FIG. 1 and 2, the plunger 3 at its outer end 8 is bracket-shaped and bears a grip roller 9 pivoted between lugs 10. A cylinder member of bush 11 is coaxially mounted outside the rod 12 of plunger 3. At rest said cylinder member is biased against plunger 3 by the contemporaneous action of coaxial springs 4 and 5. In particular the spring 4 is compressed between a shoulder 15 outside said cylinder member 11 and a surface 16, axially defining a bore 6, while the spring 5 is compressed between a crown surface 17 of said member 11 and a screw 20 threadedly engaged at the end of said rod 12 of plunger 3.

The cylinder member 11 is provided with a through-hole 11', allowing the insertion of a stem 21 of a knob 22 actuated from the outside (FIG. 2).

Figure 3:
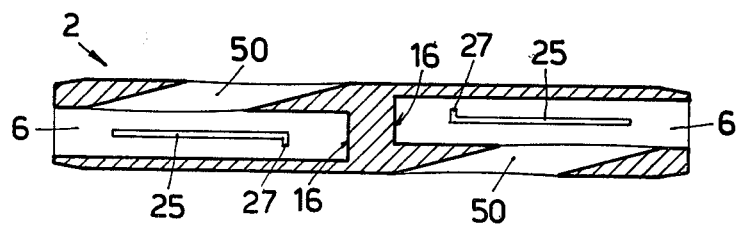
FIG. 3 shows a longitudinal section of a rope stretcher casing according to the present invention.

FIG. 3 shows a slot 25 provided on the cylinder casing 2 of the rope stretcher according to this invention. It should be noted that at the end of the slot 25 closest the mid-portion of casing 2, an L-shaped catch 27 is provided, where the stem 21 of said knob 22 can be locked. The cylindrical casing 2 is also provided with a passage 50, suitably sloped as to form an oblique angle with the central axis of the bore 6.

Also to be noted is the particular shape of the rod 12 of plunger 3. According to the embodiment of FIG. 2, said rod 12 has a substantially semicylindrical section 12' and a cylindrical end section 12''. This structural feature allows stem 21 of the actuating knob 22 to pass through said hole 11' tangentially of a flat surface 13 of said semicylindrical section 12', so that locking of stem 21 in the catch 27 of said slot 25 results in a turning motion of the small cylinder 11 of plunger 3.

The operation of the rope stretcher according to this invention is readily evident fron the hereinabove detailed description.

The cable to be clamped (not shown) is inserted into the bore 6 and the passage 50, after having axially displaced plunger 3 against the bias of springs 4 and 5. Said plunger 3 is actuated by longitudinally displacing the knob 22. In order to more easily insert a cable, the plunger can be locked in position by sinking said stem 21 into catch 27. Once the end of the cable to be clamped has reached the outlet 51 of said passage 50, the stem 21 may be unlocked by actuating said knob 22 with a slight force orthogonal to the axis of slot 25. At this point plunger 3 is pushed by springs 4 and 5 to clamp the cable between the grip roller 9 and the inner surface of casing 2, as for the devices already known in the art.

The unlocking operation is similarly carried out by means of the actuating knob 22.

The above described unclamping device provided for the present rope stretcher becomes particularly useful in this step. In fact, if the tensioning force acting on the cable is high, this force being transmitted by friction to the plunger, the actuating force to be applied to the outer knob could be excessively high and could require a very strong effort. Sometimes the unclamping might become impossible, particularly when the device is used in environments where the exposed parts are subjected to oxidation.

On the contrary, the plunger and the coaxial cylinder according to this invention permit the cable to be unclamped by means of a force which is independent from the tension acting on the cable. At first said force is equivalent to the sum of forces necessary to compress springs 4 and 5 acting on the cylindrical element 11, and the work done during this step is partially recovered as potential energy stored by spring 5. Said potential energy tends to transform into kinetic energy biasing plunger 3 to axially move in the unclamping direction of the cable. However, even if the biasing action of spring 5, compressed between the shoulder 17 of the cylinder member 11 and the screw 20, were not enough to overcome the tension applied by the cable on the plunger, the diplacement of the knob 22, orthogonal to the direction of said slot 25, allowed by catch 27, would be enough to set the plunger 3 in rotation, with a corresponding disengagement thereof, under the action of spring 5. In fact this simple operation transforms the static friction between cable and plunger into dynamic friction, having a much lower coefficient.

Moreover, it should be noted that the actuating knob 22, integral with the stem 21, may be easily pulled out from the rope stretcher according to this invention. Since after securing the cable the rope stretcher may undergo shocks or handling, this feature avoids unforeseen and undesirable unclamping.

Furthermore, the catch 27 provided on the slot 25, besides being useful during the unclamping step, helps in inserting a cable with both hands, since the clamping plunger is maintained withdrawn inside the bore 6 by the stem 21, housed inside the catch 27.

It is readily apparent that the rope stretcher of this invention, which is useful whereever a tensioned cable has to be secured, may undergo structural modifications in order to specialize its application. The preferred embodiment shown herein is particularly useful when the ends of the same cable or of two different cables (not necessarily of the same diameter) should be joined together, but it is evident that one of the ends of the cylindrical casing may be provided with a hook or a spring catch, even replacing the corresponding locking device, or that the bore 6 and/or the passage 50 may be internally threaded or wrinkled to act as a further securing means.

It is also evident that the rope stretcher according to this invention is suitable to clamp cables of any diameter, but obviously those with a diameter larger that bore 6.

While this invention has been described in detail with reference to the annexed drawings and to a particular preferred embodiment, variations and/or modifications can be brought by those skilled in the art without departing from the scope and spirit of this invention.

What I claim is:

1. A rope stretcher for clamping cables comprising: a casing having a bore and a cable clamping passage defined therein in intersecting relation; a plunger including a rod extending longitudinally in said bore; a clamping member rotatably mounted at a first end of said plunger closest to the intersection of said bore and said passage; and a first spring positioned to bias said plunger in said bore toward said intersection of said bore and said passage; said rope stretcher being characterized by:

a short annular cylinder slidably encircling a portion of said plunger rod;

stop means adjacent said first end of said plunger for preventing said cylinder from sliding beyond said first end;

shoulder means on said plunger rod at a location spaced from said first end;

auxiliary spring means encircling said plunger rod between said cylinder and said shoulder means for biasing said cylinder toward said first end of said plunger; and actuating means for selectively displacing said cylinder along said plunger rod against the bias of said auxiliary spring means.

2. The rope stretcher according to claim 1 wherein said actuating means includes:

a through-hole define transversely through a wall of said cylinder;

a longitudinally-extending slot define through said casing to said bore; and an actuating member including a knob secured to a stem, said stem being inserted through said slot and into said through-hole;

whereby movement of said actuating member along said slot results in movement of said cylinder along said plunger rod, the length of said slot defining the extent of plunger movement within said bore.

3. The rope stretcher according to claim 2 further characterized by:

catch means, in the form of an extension from said slot, for receiving and holding the stem of said actuating member against the forces of the compressed first spring and auxiliary spring means.

4. A rope stretcher according to claim 2, wherein said rod of said plunger comprises a first substantially semicylindrical portion and a second cylindrical end portion, whereby said stem of the actuating knob is inserted in said through-hole of said small cylinder and tangentially engages the flat surface of said first semicylindrical portion.

* * * * *